United States Patent [19]

Yamaguchi et al.

[11] Patent Number: 4,936,648
[45] Date of Patent: Jun. 26, 1990

[54] TOWING COMPOSITE COAXIAL OPTICAL CABLE

[75] Inventors: Masayoshi Yamaguchi, Osaka; Toshio Hagihara, Tokyo, both of Japan

[73] Assignee: Sumitomo Electric Industries, Ltd., Osaka, Japan

[21] Appl. No.: 366,137

[22] Filed: Jun. 14, 1989

[30] Foreign Application Priority Data

Jul. 26, 1988 [JP] Japan .............................. 63-98737[U]

[51] Int. Cl.$^5$ .............................................. GB02 6/44
[52] U.S. Cl. ............................................... 350/96.23
[58] Field of Search ........................... 350/96.20, 96.23

[56] References Cited

U.S. PATENT DOCUMENTS

| | | | |
|---|---|---|---|
| 4,239,336 | 12/1980 | Parfree et al. | 350/96.23 |
| 4,671,611 | 6/1987 | Allemand et al. | 350/96.23 |
| 4,752,113 | 6/1988 | Saito et al. | 350/96.23 |
| 4,767,182 | 8/1980 | Parfree et al. | 350/96.23 |
| 4,775,213 | 10/1988 | Kitayama | 350/96.23 |
| 4,793,686 | 12/1988 | Saito | 350/96.23 |

Primary Examiner—John D. Lee
Assistant Examiner—Phan T. Heartney
Attorney, Agent, or Firm—Wenderoth, Lind & Ponack

[57] ABSTRACT

An optical fiber cable for towing. An elongated central conductor includes a plurality of spiral grooves in the outer periphery thereof. Optical fibers are mounted within each of these grooves by use of a waterproof compound. An insulating layer covers the central conductor and the optical fibers. An outer conductor formed by a plurality of strands of conducting wire are wound about this insulating layer. A composite tape formed of a copper tape and an insulating tape is then wound about the outer conductor. The copper tape portion of the composite tape is in contact with the wire which forms the outer conductor. An armor layer of wire is wound about this entire structure. This arrangement provides an optical fiber cable with improved strength, ease of manufacture, and improved electromagnetic shielding.

7 Claims, 1 Drawing Sheet

TOWING COMPOSITE COAXIAL OPTICAL CABLE

FIELD OF THE INVENTION

The present invention relates to a composite coaxial optical cable used for towing in water.

DESCRIPTION OF THE PRIOR ART

A "photocommunicative cable" disclosed in, for example Japanese Patent Laid-Open No. Sho 51-128543 has been known as one example of a conventional composite coaxial optical cable.

FIG. 2 is a sectional view showing such a cable. Referring now to FIG. 2, reference numeral (11) designates a central conductor formed of a copper pipe, with optical fibers (12) being housed in a hollow portion of said central conductor (11). Reference numeral (13) designates an insulating layer formed of, for example foam polyethylene and the like, reference numeral (14) designates an outer conductor, and reference numeral (15) designates a plastic sheath formed of polyethylene, polyvinyl chloride and the like.

The above-described conventional composite coaxial optical cable has is a copper pipe is used as the central conductor (11) and the optical fibers (12) are housed in the hollow portion of the copper pipe. Since such construction is formed by winding copper tape around the outer side of the optical fibers (12), the optical fibers are apt to be damaged, whereby it is difficult to produce a long cable.

In addition, in the event that it is used for towing in water, there is the possibility that the copper pipe used as the central conductor (11) housing the optical fibers (12) is broken by hydraulic pressure.

Furthermore, a problem occurs in that the towing cable is repeatedly bent at sheaves on a ship, whereby braided copper wires used as the outer conductor and the outer conductor of the copper pipe are repeatedly bent which is apt to break the wires and produce cracks.

BRIEF SUMMARY OF THE INVENTION

The present invention provides a composite coaxial optical cable for towing capable of eliminating the above-described problem and is characterized in that at least one spiral groove is formed on an outer circumference of a central conductor, optical fibers are housed in said spiral groove, a gap between the groove and the optical fibers being filled with a watertight compound, an outer conductor being formed of a large number of copper wires wound sideways, and a composite tape comprising a copper tape and a plastic tape adhered to each other being wound around the outer conductor with the copper tape as the inner side.

DETAILED DESCRIPTION OF THE INVENTION

The present invention is described in detail with reference to FIG. 1.

Figure 1:
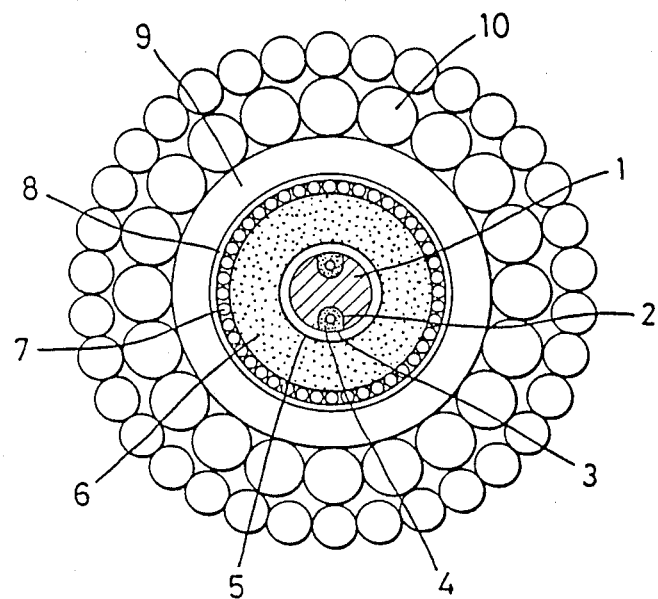
FIG. 1 is a sectional view of a composite coaxial optical cable for towing according to the present invention.
Figure 2:
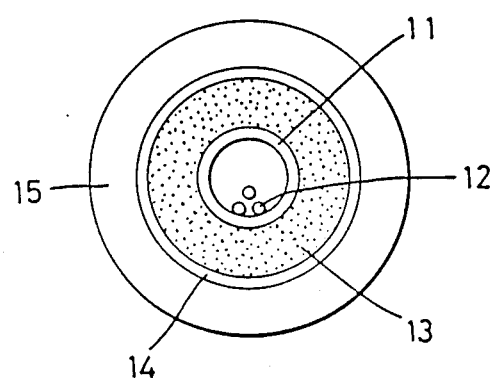
FIG. 2 is a sectional view of one example of the conventional composite coaxial optical cables.

Referring to FIG. 1, a usual copper conductor is used as a central conductor (1), at least one spiral groove (2) being formed on an outer circumference of said central conductor (1). Optical fibers (3), provided with a coating layer formed of nylon and the like formed thereon, are being housed in the spiral groove (2). A gap formed between the spiral groove (2) and the optical fibers (3) is filled with a watertight compound (4), and a cap tape layer (5), such as polyethylene tape and nylon tape, is wound around the watertight compound (4). A usual insulating layer (6) formed of polyethylene, foam polyethylene and the like is wound around the cap tape layer (5).

An outer conductor (7) is formed of a large number of copper wires wound sideways and a composite tape comprising a copper tape and a plastic tape, formed of polyester, polyethylene and the like, integrally adhered to each other is wound around the outer conductor (7) with the copper tape as the inner side. A plastic sheath (9) formed of polyethylene, polyvinyl chloride and the like is put on the composite tape.

An armor comprising single or double steel wires, which become a high-tensile wire when towing, is wound around the plastic sheath (9).

In the above described composite coaxial optical cable according to the present invention, the optical fibers are housed in the spiral groove formed on the outer circumference of the central conductor, so that the optical fibers are not damaged so much when produced and a general optical glass fiber coated with nylon can be used as the optical fiber, whereby a long composite coaxial optical cable can be easily produced.

In addition, a copper conductor is used as the central conductor for housing the optical fibers therein, and the gap formed between the optical fibers and the groove, in which the optical fibers are housed, is filled with the watertight compound, so that the composite coaxial optical cable is not broken by the external hydraulic pressure.

Furthermore, the outer conductor is formed of a copper wire wound sideways, so that the breakage of wire is unlikely to occur even though the composite coaxial optical cable is repeatedly bent at sheaves on a ship. In the event that the copper wire is wound sideways in such a manner, the gaps formed among the copper wires lead to a reduced shielding effect, so that in the present invention the copper tape is wound around the copper wires to prevent the shielding effect from being reduced. In this case, since copper tape is weak against the bending, the composite tape comprising the plastic tape in addition to the copper tape is used to improve the strength, and thus a composite coaxial optical cable superior in bending strength can be obtained.

As described above, the composite coaxial optical cable according to the present invention is superior in hydraulic pressure resistance and bending strength and easy to produce in the form of a long product. The cost can also be reduced.

Accordingly, the composite coaxial optical cable according to the present invention is remarkably effective as a towing cable.

We claim:

1. An optical cable, comprising:
   an elongated central conductor, said central conductor having an outer periphery and at least one spiral groove formed in said outer periphery, each said groove having a width and a depth;

an optical fiber disposed in each said groove, said optical fiber having a diameter less than both said width and said depth of said groove to thereby define a gap between said optical fiber and an associated said groove;

a watertight compound surrounding said optical fiber to fill said gap;

an outer conductor surrounding said central conductor, said optical fiber and said compound, said outer conductor being formed of a plurality of wires wound about said central conductor, said optical fiber and said compound; and a composite tape surrounding said outer conductor, said composite tape consisting of a copper tape and an insulating tape wound about said outer conductor with said copper tape contacting said plurality of wires forming said outer conductor.

2. A cable as in claim 1, further comprising insulating means interposed between said central conductor and said outer conductor.

3. A cable a in claim 2, further comprising armor means surrounding said composite tape.

4. A cable as in claim 2, wherein said insulating means comprises an insulating tape wound about said central conductor, said optical fiber and said compound, and an insulating layer covering said insulating tape.

5. A cable as in claim 4, further comprising armor means surrounding said composite tape.

6. A cable as in claim 5, wherein said armor means comprises a plurality of metallic wires wound about said composite tape.

7. A cable as in claim 6, further comprising a plastic sheath interposed between said composite tape and said armor means.

* * * * *